US009227226B2

(12) United States Patent
Mestrallet et al.

(10) Patent No.: US 9,227,226 B2
(45) Date of Patent: Jan. 5, 2016

(54) CART FOR ASSISTING IN TRANSFERRING MAILPIECES FOR A POSTAL SORTING MACHINE, AND A POSTAL SORTING INSTALLATION

(71) Applicant: SOLYSTIC, Bagneux (FR)

(72) Inventors: Frederic Mestrallet, Etoile sur Rhone (FR); Pierre Jourdan, Valence (FR); Olivier Schott, Montgeron (FR)

(73) Assignee: SOLYSTIC, Gentilly (FR)

( * ) Notice: Subject to any disclaimer, the term of this patent is extended or adjusted under 35 U.S.C. 154(b) by 192 days.

(21) Appl. No.: 13/984,178

(22) PCT Filed: Apr. 15, 2013

(86) PCT No.: PCT/FR2013/050815
§ 371 (c)(1),
(2) Date: Aug. 7, 2013

(87) PCT Pub. No.: WO2013/018265
PCT Pub. Date: Dec. 12, 2013

(65) Prior Publication Data
US 2014/0093338 A1    Apr. 3, 2014

(30) Foreign Application Priority Data

Jun. 8, 2012  (FR) ..................................... 12 55362

(51) Int. Cl.
*B07C 3/00*  (2006.01)
*B65G 1/00*  (2006.01)
*B65G 49/00*  (2006.01)

(52) U.S. Cl.
CPC . *B07C 3/008* (2013.01); *B07C 3/00* (2013.01); *B65G 1/00* (2013.01); *B65G 49/00* (2013.01)

(58) Field of Classification Search
CPC ...... B07C 3/005; B07C 3/008; B65G 1/0435; B65G 1/0492; B65G 1/0407; B65G 1/065; B65G 1/08; B65G 1/10; B65G 11/04; B65H 1/08; B65H 1/12; B65H 31/32; B65H 31/3072; B65H 2405/312; B65H 2701/1916; B65H 2801/78; A47B 51/00; A47B 53/02
USPC .................................................. 414/490, 940
See application file for complete search history.

(56) References Cited

U.S. PATENT DOCUMENTS 3,822,025 A *  7/1974  Loos ............................. 414/280
4,239,436 A * 12/1980  Wildenaur ................... 414/276
(Continued)

FOREIGN PATENT DOCUMENTS

DE    199 01 444 C1    2/2000
FR    2 680 121 A1     2/1993
FR    2 940 149 A1     6/2010

OTHER PUBLICATIONS

French Search Report for FR 1255362 dated Feb. 19, 2013.

*Primary Examiner* — Glenn Myers
(74) *Attorney, Agent, or Firm* — Sughrue Mion, PLLC

(57) ABSTRACT

A cart (2) for assisting in transferring mailpieces (100) for a sorting machine (1) having a row of sorting outlets (10) for the mailpieces (100) stacked on a work surface (11), said cart (2) for assisting in transferring mailpieces including a support (23) supporting a tray (101) to be filled, a back plate (20) carrying guide means (24) co-operating with a longitudinal runner (14) on said sorting machine (1), said back plate (20) being extended by a transfer ramp (26) inclined relative to said back plate (20) with which it forms an acute angle and designed to bridge over the edge of the work surface (11) to come flush with said work surface (11) from above. A postal sorting installation including a sorting machine (1) and a cart (2) as described for assisting in transferring mailpieces.

8 Claims, 4 Drawing Sheets

(56) References Cited

U.S. PATENT DOCUMENTS

| | | | |
|---|---|---|---|
| 4,275,665 A * | 6/1981 | Silverman | 108/14 |
| 5,570,990 A * | 11/1996 | Bonora et al. | 414/543 |
| 5,845,915 A * | 12/1998 | Wilson | 280/47.19 |
| 6,033,175 A * | 3/2000 | Pflueger et al. | 414/401 |
| 6,102,647 A * | 8/2000 | Yap | 414/539 |
| 6,390,756 B1 * | 5/2002 | Isaacs et al. | 414/281 |
| 6,454,512 B1 * | 9/2002 | Weiss | 414/663 |
| 2005/0042063 A1 * | 2/2005 | Ehrenleitner | 414/266 |
| 2010/0091099 A1 * | 4/2010 | Franzone | 348/61 |
| 2011/0211939 A1 * | 9/2011 | Hugues et al. | 414/789.9 |

* cited by examiner

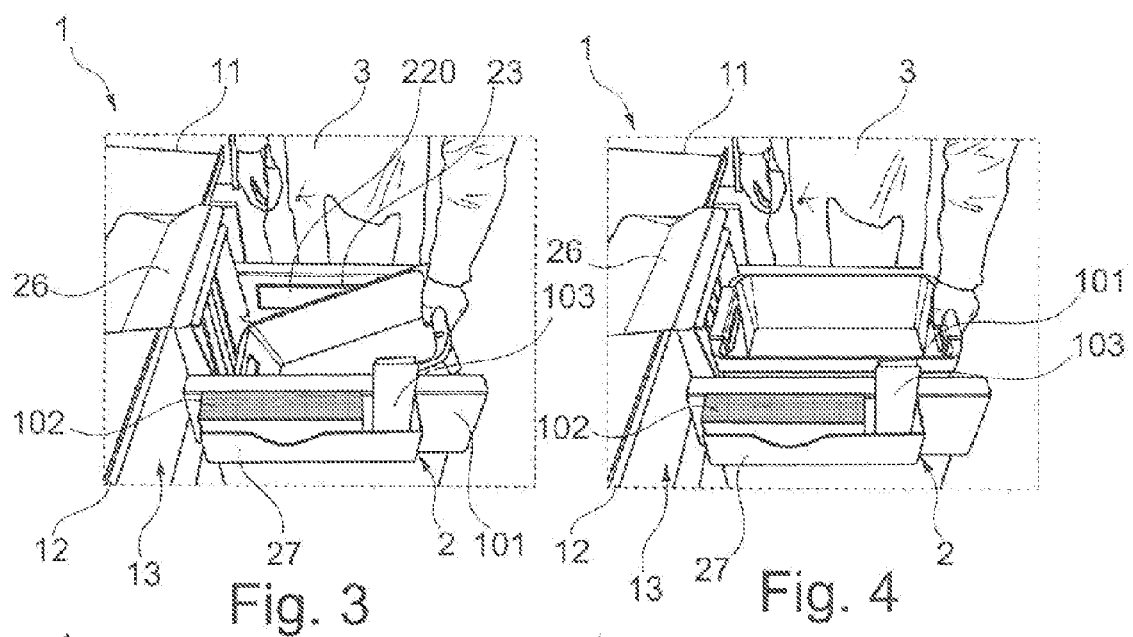
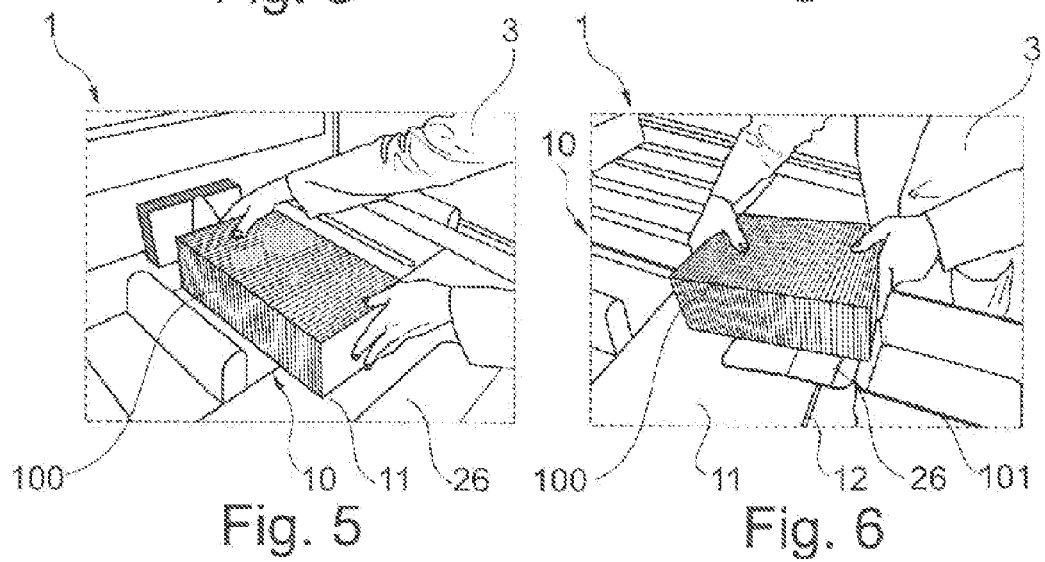
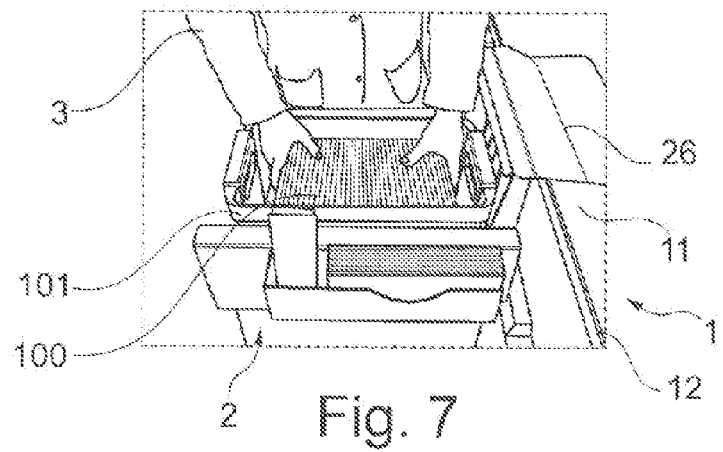

CART FOR ASSISTING IN TRANSFERRING MAILPIECES FOR A POSTAL SORTING MACHINE, AND A POSTAL SORTING INSTALLATION

CROSS REFERENCE TO RELATED APPLICATIONS

This application is a National Stage of International Application No. PCT/FR2013/050815, filed on Apr. 15, 2013, which claims priority from French Patent Application No. 12 55362, filed on Jun. 8, 2012, the contents of all of which are incorporated herein by reference in their entirety.

TECHNICAL FIELD

The invention relates to a cart for assisting in transferring mailpieces for a postal sorting machine having a row of sorting outlets at each of which the mailpieces are stacked on edge on a work surface, the cart for assisting in transferring mailpieces including at least one support defining the bottom of a filling zone suitable for receiving a tray to be filled with stacked mailpieces. In the meaning of the invention, a "mailpiece" designates, particularly but not exclusively, a postal item such as, for example, an ordinary letter, a magazine, an envelope, a newspaper, or indeed a catalog, optionally in an envelope or in some other wrapping.

The invention also relates to a postal sorting installation including at least one sorting machine provided with a row of sorting outlets at each of which mailpieces are stacked on edge on a work surface, and at least one cart for assisting in transferring mailpieces into trays to be filled and then in transferring the full trays.

PRIOR ART

Shuttle carts are in common use for removing mailpieces stacked at sorting outlets. Such shuttle carts are moved from one sorting machine to another. One or more trays are thus placed on a shuttle cart that is disposed facing the sorting outlet to be emptied. Then, the operator loads the tray by manually taking hold of a stack of mailpieces from the sorting outlet, by lifting it up over the edge of the work surface and in particular over the jogging strip defining the edge of the work surface, so as to move the stack above the tray before placing the stack in said tray. Once the tray is full, it is replaced with an empty tray that is then filled in its turn. The empty tray is taken either from an empties zone provided under the work surface of the machine, or from the stock of empty trays in the cart or from a stock that can be remote and provided for that purpose. In order to empty another sorting outlet, the shuttle cart needs to be moved to face said other sorting outlet, and the same operations for loading the tray need to be repeated. During these loading operations, there exist risks of the stack becoming destabilized and of mailpieces falling, in particular while the stack of mailpieces is being raised and being moved over the top of the work surface edge and of the jogging strip. In addition, this manipulation of the mailpieces is tiring for the operator and a source of musculoskeletal disorders. Furthermore, the top of the tray to be filled is rarely at an optimum height, which increases the discomfort of the operator. Finally, managing the empty trays can require laborious handling for replacing a full tray with an empty tray on the shuttle cart, the operating sometimes having to go back and forth repeatedly in order to fetch empty trays as the mailpieces are removed. When the empty trays are stored under the work surface of the sorting machine, the operator must bend down or pull out the empty trays one by one. Those operations are particularly tiring to perform. In addition, the quantity of trays suitable for being stored in the sorting machine is limited to one tray per sorting outlet and can be insufficient. It is then necessary for the operator to have a few additional empty trays available. When the mailpieces at the sorting outlets are separated from one another by separators or by labels, such separators or labels must be able to be taken out without being placed in the trays. Since there is no dedicated location for receiving such separators, the operator uses an empty tray for collecting them, thereby using up a tray unnecessarily, that tray being, for example, placed on the work surface and thus cluttering it. Current use of shuttle carts is therefore unsatisfactory.

SUMMARY OF THE INVENTION

An object of the invention is to remedy those drawbacks by proposing a cart for assisting in transferring mailpieces that is designed to be used between the sorting machine and a shuttle cart for the purpose of loading the stacked mailpieces in the trays before the loaded trays are transported by means of the shuttle carts, such transfer carts improving ergonomics during the operations for loading the trays, limiting the risks of the stacks being destabilized and of the mailpieces falling, and making it possible to optimize the use of the empty trays.

To this end, the invention provides a cart for assisting in transferring mailpieces for a postal sorting machine having a row of sorting outlets at each of which the mailpieces are stacked on edge on a work surface, the cart for assisting in transferring mailpieces including a support defining the bottom of a filling zone suitable for receiving a tray to be filled with stacked mailpieces, said cart for assisting in transferring mailpieces being characterized in that it includes a back plate carrying guide means designed to co-operate with a longitudinal runner provided on the sorting machine for the purpose of guiding the cart for assisting in transferring mailpieces along the work surface, in that said back plate is extended by a transfer ramp inclined relative to the back plate with which it forms an acute angle and designed to bridge over the edge of the work surface to come flush with the work surface from above, regardless of the longitudinal position of the transfer cart.

The term "plate" is not limiting and also refers to any equivalent such as, for example, a framework of any type performing the same zone-defining function.

The basic idea of the invention consists in providing a cart for assisting in transferring mailpiece, which cart is movable longitudinally along the work surface and is provided with a transfer ramp enabling the stack of mailpieces isolated by the operator to slide from the sorting outlet to the filling zone while crossing over edge of the working surface without having to be lifted.

The tray of the invention for assisting in transferring mailpieces may advantageously have the following features:
   the cart for assisting in transferring mailpieces includes a storage zone for storing trays, the top of which zone is defined by the support and the bottom of which zone is defined by a bottom plate secured to the back plate, the storage zone being suitable for receiving at least two trays under the filling zone;
   the support is mounted to move between a deployed position in which it defines the bottom of the filling zone by forming a bearing plane for a tray, and a retracted position in which it is set back relative to the filling zone and allows a tray to go past from the storage zone to the filling zone without leaving the cart for assisting in transferring mailpieces;

the support is arranged to go from the deployed position to the retracted position by contact with a tray being moved from the storage zone to the filling zone;

the support is coupled to resilient return means urging it to stay in the deployed position;

the support includes two side rails provided on either side of the filling zone;

the cart for assisting in transferring mailpieces includes lifting means arranged to move a tray automatically from the storage zone to the filling zone when the filling zone is empty of any tray;

the lifting means include a lifting finger provided in the storage zone and suitable for carrying at least one tray, a guide rail being arranged to guide the lifting finger between the storage zone and the filling zone, the lifting finger being connected to a counterweight system urging the lifting finger towards the filling zone; and the cart for assisting in transferring mailpieces includes side walls defining the filling zone and the storage zone, and at least one removable receptacle provided with attaching means arranged to allow it to be attached to either of the side walls.

The invention also provides a postal sorting installation including at least one sorting machine provided with a row of sorting outlets at each of which mailpieces are stacked on edge on a work surface, and at least one cart for assisting in transferring mailpieces into trays to be filled, and then in transferring the full trays, said postal sorting installation being characterized in that the at least one cart for assisting in transferring mailpieces is a cart for assisting in transferring mailpieces as described above, in that the sorting machine is provided with at least one longitudinal runner extending under the work surface and suitable for co-operating with the guide means for longitudinally guiding the cart for assisting in transferring mailpieces along the work surface, and in that the distance between the guide means and the transfer ramp, and the distance between the longitudinal runner and the work surface are arranged so that the transfer ramp bridges over the edge of the work surface to come flush with the work surface from above regardless of the longitudinal position of the cart for assisting in transferring mailpieces.

BRIEF DESCRIPTION OF THE DRAWINGS

The present invention can be better understood and other advantages appear on reading the following detailed description of embodiments given by way of non-limiting example and with reference to the accompanying drawings, in which:

FIGS. 3 to 7 are fragmentary perspective views of the postal sorting installation of FIGS. 1 and 2, showing the steps of taking an empty tray from the storage zone, of placing it in the filling zone, and of transferring the stack of mailpieces stacked on edge from the sorting outlet facing the tray into said tray;

DESCRIPTION OF EMBODIMENTS

Figure 1:
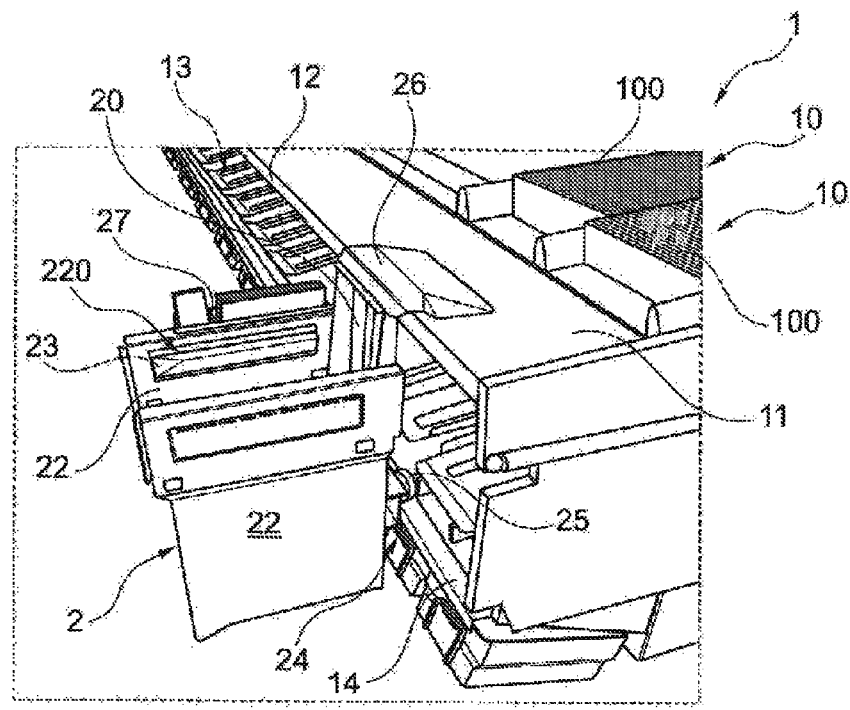
FIGS. 1 and 2 are fragmentary perspective views of a postal sorting installation including a sorting machine provided with sorting outlets, and a cart of the invention for assisting in transferring mailpieces that is disposed facing one of the sorting outlets, the cart for assisting in transferring mailpieces being shown without any tray in the filling zone and with empty trays in the storage zone of the cart.

The postal sorting installation of the invention includes one or more postal sorting machines, each provided with at least one cart for assisting in transferring mailpieces, which cart is designed to facilitate filling trays with stacks of mailpieces taken from sorting outlets of the sorting machine, before transporting the filled trays by shuttle cart to some other destination.

As shown in FIGS. 1 to 10 and 12, the postal sorting machine 1 is of known type. It has a row of sorting outlets 10 at which, after the sorting process, the mailpieces 100 are stacked on edge, on a work surface 11. The work surface 11 may be provided with a jogging strip 12 blocking the downstream edges of mailpieces 100, thereby preventing the mailpieces 100 from falling off the front of the work surface 11. Under the work surface 11, the sorting machine 1 has at least one empties zone 13 suitable for receiving empty trays 101 ready for use. In the example shown, the sorting machine 1 has two superposed empties zones. The sorting machine 1 also has one or more longitudinal runners 14 extending under the work surface 11 and parallel to the edge of the work surface 11 that is provided with the jogging strip 12. In the example shown in particular by FIG. 1, only one longitudinal runner 14 is visible. The sorting machine 1 may also have a longitudinal member (not shown) coupled to one or other of the longitudinal runners 14 and provided with setbacks (not shown) that are disposed uniformly relative to the sorting outlets 10. The functions of the longitudinal runner 14, of the longitudinal member and of its setbacks are explained below.

Figure 2:
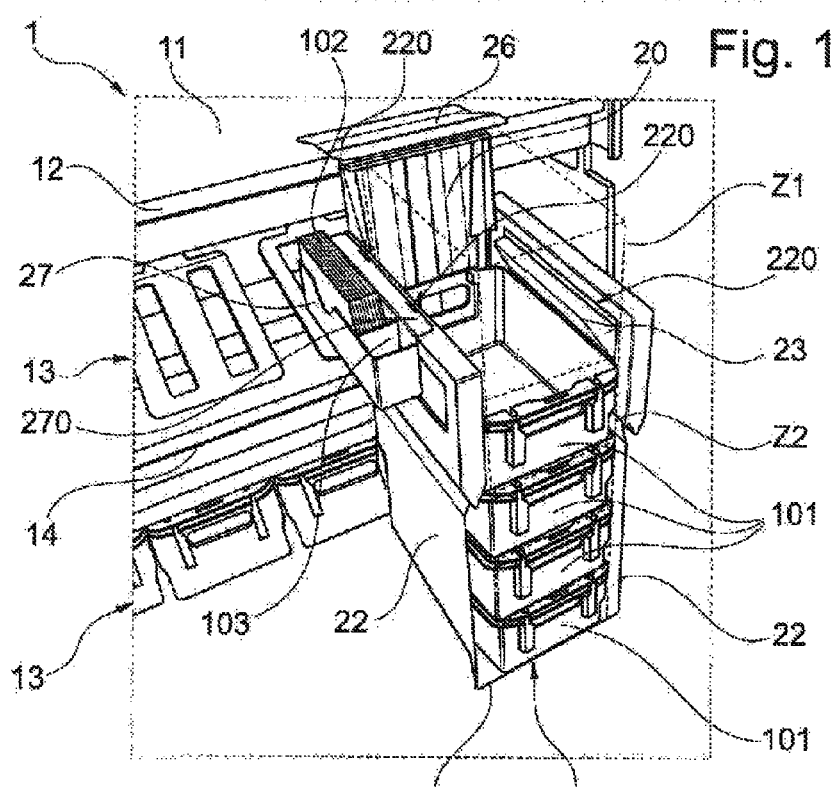

With reference in particular to FIGS. 1 and 2, the cart 2 for assisting in transferring mailpieces has a back plate 20, a bottom plate 21, and two side plates 22 secured to the back plate 20. In the example shown, the side plates 22 do not extend to the top of the back plate 20.

The cart 2 for assisting in transferring mailpieces has a support 23 formed in this example by two side rails 23 disposed facing each other and carried by the side plates 22, and defining a bearing plane for receiving a tray 101 to be filled, with said tray to be filled bearing against said bearing plane. Each of the side rails 23 has at least one transverse portion 230 (visible in FIG. 11) extending substantially perpendicularly to the back plate 20 and substantially parallel to the bottom plate 21. The bearing plane is thus defined by the transverse portions 230. Between the side rails 23 and the bottom plate 21, the side plates 22 and the back plate 20 define a storage zone Z2 (shown diagrammatically by dashed lines in FIGS. 2 and 11) in which empty trays 101 can be stored, stacked on one another. Above the side rails 23, the side plates 22 and the back plate 20 define a filling zone Z1 (shown diagrammatically by dashed lines in FIGS. 2 and 11) in which a tray 101 to be filled can be disposed, bearing on the side rails 23. Each of the side rails 23 is mounted to move between a deployed position and a retracted position. In their deployed position, shown in FIGS. 1, 2, 8, 10, and 11, the side rails 23 project between the side plates 22 to define the bearing plane for the tray 101, and thus to define the filling zone Z1. In their retracted position, shown in FIG. 3, the side rails 23 are set back relative to the side plates 22 and allow the tray 101 to pass through from the storage zone Z2 to the filling zone Z1. In the example shown in particular in FIG. 11, each side rail 23 is received in part in the side plate 22 from which it protrudes via a slot 221 when it is in the deployed position. In addition, each side rail 23 is hinged relative to a pivot axis A carried by the corresponding side plate 22 and substantially parallel to the bottom plate 21. Each of the side rails 23 is formed by a folded metal sheet having an upside-down nose including an inclined portion and the transverse portion 230 forming the bearing plane. The side rails 23 may naturally be hinged using any other equivalent mechanism. Each side rail 23 is also coupled to resilient return means (not shown) provided between the side rail 23 and the side plate 22, thereby exerting a return force as indicated by arrow D, urging the side rail 23 into its deployed position. For example, said resilient return means comprise a helical spring, a spring blade, or any other equivalent means.

In an embodiment that is not shown, the side rails may be replaced with a single support plate, e.g. mounted to pivot on the back plate.

The cart 2 for assisting in transferring mailpieces is further provided with guide means 24 (visible in FIG. 1). For example, the guide means 24 include channel-section members carried by the back plate 20 on the other side of said back plate 20 from the side on which the filling zone Z1 and the storage zone Z2 are situated. These guide means 24 are engaged with the longitudinal runner 14 on the sorting machine 1 and thus co-operate with the longitudinal runner 14 to guide the mailpiece transfer cart 2 longitudinally along the work surface 11. The guide means 24 may have one or more guide wheels 25 (one of which is visible in FIG. 1), which wheels are carried by the cart 2 for assisting in transferring mailpieces and facilitate moving the guide means 24 relative to the longitudinal runner 14. The guide means 24 may also be coupled to an indexing wheel (not shown) carried by the cart 2 for assisting in transferring mailpieces, and urged by a spring (not shown) towards the sorting machine 1. Such an indexing wheel is provided facing the longitudinal member so that, when the indexing wheel is facing a setback, the filling zone Z1 is situated facing a sorting outlet 10. The indexing wheel and the setbacks thus make it possible to position the mailpiece transfer cart 2 accurately in front of each sorting outlet 10 in succession.

Finally, the cart 2 for assisting in transferring mailpieces includes a transfer ramp 26 that is inclined relative to the top of the back plate 20. The transfer ramp 26 points away from the filling zone Z1 and from the storage zone Z2 relative to the back plate 20. In addition, the transfer ramp 26 is inclined towards the guide means 24. The distance between the guide means 24 and the transfer ramp 26, and the distance between the longitudinal runner 14 and the work surface 11 are such that, when the guide means 24 are engaged with the longitudinal runner 14, the transfer ramp 26 bridges over the edge of the work surface 11 and in particular over the jogging edge 12 to come flush with the work surface 11 from above.

The cart 2 for assisting in transferring mailpieces also includes a removable receptacle 27 designed, for example, to receive separators 102 and/or labels 103 used to separate stacks of mailpieces 100 that are to be taken from the sorting outlets 10. The removable receptacle 27 is provided with attaching means, such as, for example hooks 270 (visible in FIG. 2) enabling it to be suspended on the top edge of a side wall 22, on the other side of the side wall 22 relative to the filling zone Z1. For improved stability of the removable receptacle 27, the top edge of the side plate 22 may be provided with locking slots 220 (visible in FIG. 2) designed to receive the hooks 270.

The dimensions of the cart 2 for assisting in transferring mailpieces are adapted to match the dimensions of the trays 101 used and the dimensions of the sorting machine 1. In particular, the height of the filling zone Z1, between the top of the back plate 20 from which the transfer ramp 26 extends, and the side rails 23, corresponds substantially to the height of a tray 101. Similarly, the height of the storage zone Z2, between the bottom plate 21 and the side rails 23, is slightly greater than the height of a plurality of stacked trays 101, the number of which is adapted accordingly. The combined height of the filling zone Z1 and of the storage zone Z2 is naturally adapted as a function of the height of the work surface 11 relative to the floor so that the bottom plate 21 is situated above the floor, without any friction so as not to hinder longitudinal movement of the mailpiece transfer cart 2 along the longitudinal runner 14.

While the sorting machine 1 is sorting, the cart 2 for assisting in transferring mailpieces may be slid to one of the ends of the work surface 11 where it is stored. As soon as the operator 3 needs to empty a sorting outlet 10, said operator moves the mailpiece transfer cart 2 by sliding it along the longitudinal runner 14 until it is facing the sorting outlet 10 in question. The indexing wheel engaging in the corresponding setback helps the operator 3 to position the mailpiece transfer cart 2 properly relative to the sorting outlets 10. Since the transfer ramp 26 is above the work surface 11, it does not hinder the longitudinal movement of the cart 2 for assisting in transferring mailpieces. The cart 2 for assisting in transferring mailpieces is then ready for use, facing a sorting outlet 10, as shown in FIGS. 1 and 2.

With reference to FIG. 3, the operator 3 takes hold of an empty tray 101 from the storage zone Z2 and raises it towards the filling zone Z1 by causing it to go between the side rails 23. During this vertical displacement, the storage tray 101 pushes the side rails 23 back from their deployed position towards their retracted position. The side rails 23 thus retract into the side plates 22 so as to allow the tray 101 to go past from the storage zone Z2 to the filling zone Z1.

With reference to FIG. 4, once the tray 101 is above the side rails 23, the resilient return means bring the side rails 23 back into their deployed position in which they serve to bear against the empty tray 101 that is placed on them and that is then available to receive the stacks of mailpieces 100.

In order to perform the preceding operations, the operator 3 performs simple movements without having to bend down or stoop.

With reference to FIG. 5, the operator 3 then takes hold of a stack of mailpieces 100 previously stacked by the sorting machine 1 at the sorting outlet 10 to be emptied. If a separator 102 or a label 103 present at the sorting outlet is to be taken, the operator 3 places it in the removable receptacle 27.

With reference to FIG. 6, the operator 3 slides the stack of mailpieces 100 over the work surface 11 towards the edge of the work surface 11, and then over the transfer ramp 26 that thus enables the edge of the work surface 11 and in particular the jogging strip 12 to be crossed easily.

With reference to FIG. 7, the operator 3 then places the stack of mailpieces 100 in the tray 101.

Figure 12:
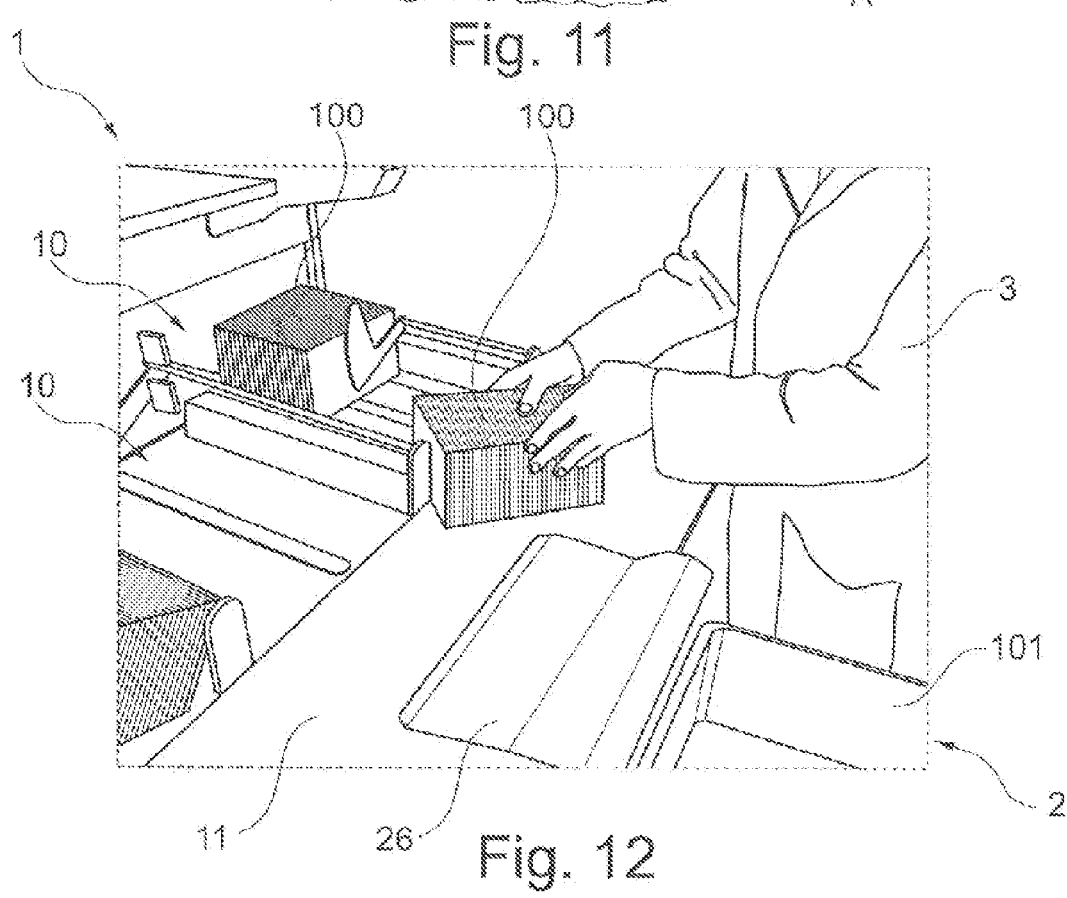
FIG. 12 is a fragmentary perspective view of the postal sorting installation corresponding to FIG. 6, showing a step of filling with a stack of mailpieces stacked on edge in a sorting outlet adjacent to the sorting outlet facing the transfer cart.

With reference to FIG. 12, once the sorting outlet 10 directly facing the cart 2 for assisting in transferring mailpieces has been emptied, the operator 3 can also, without moving the cart 2 for assisting in transferring mailpieces, empty the sorting outlet 10 adjacent to the preceding sorting outlet.

The stack of mailpieces 100 is thus loaded into the tray 101 as described above with simple movements and while limiting the risks of the stack of mailpieces 100 being destabilized, in particular while it is crossing the edge of the work surface 11 and the jogging strip 12.

Once the tray 101 present in the filling zone Z1 is full, it can be loaded onto a shuttle cart (not shown) traveling from one sorting machine 1 to another or to some other destination. A new empty tray 101 can be taken from the storage zone Z2 to be placed in the filling zone Z1 without requiring the operator to go and fetch an empty tray 101 from the end of the sorting machine 1 or from any other place. Managing the empty trays 101 and to-ing and fro-ing of the operator 3 are thus optimized.

Figure 8:
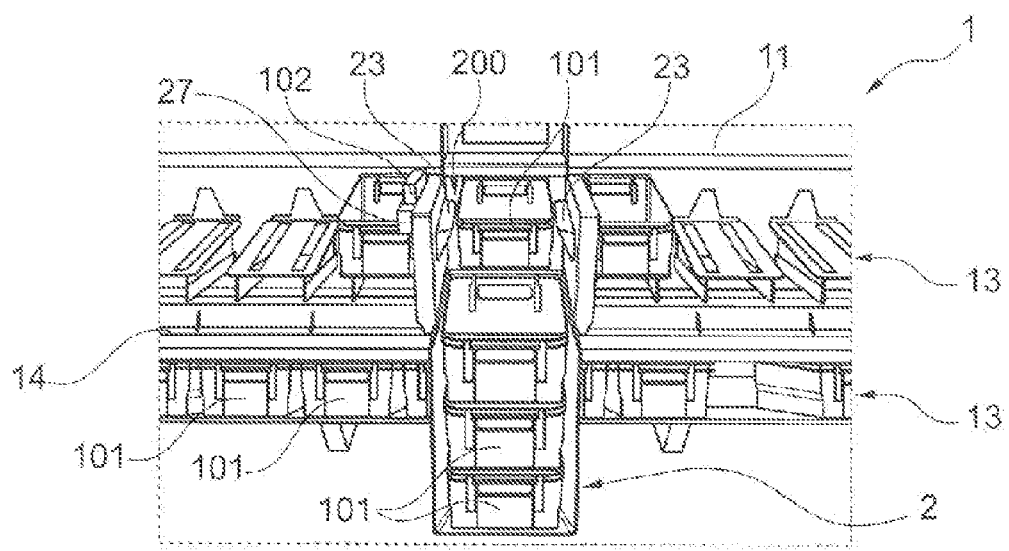
FIGS. 8 to 10 are fragmentary perspective views of the postal sorting installation of FIGS. 1 and 2, showing the steps of taking an empty tray from the empties zone of the sorting machine, and of placing it in the filling zone.
Figure 9:
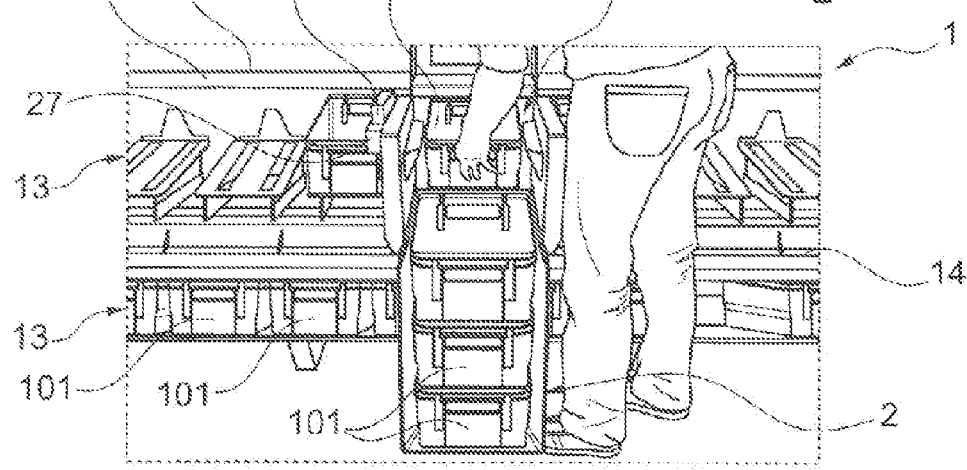
Figure 10:
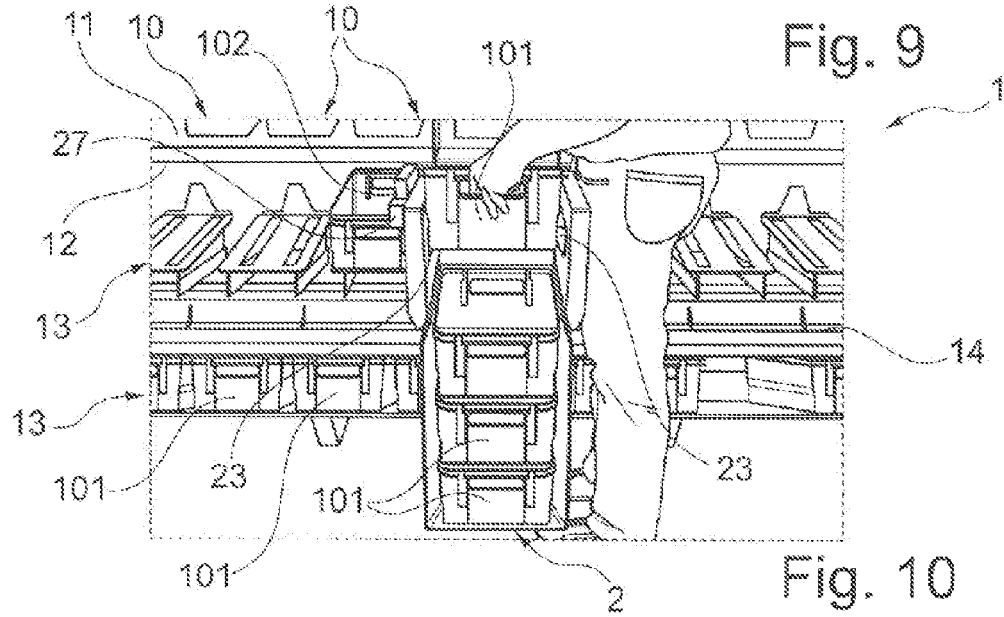
Figure 11:
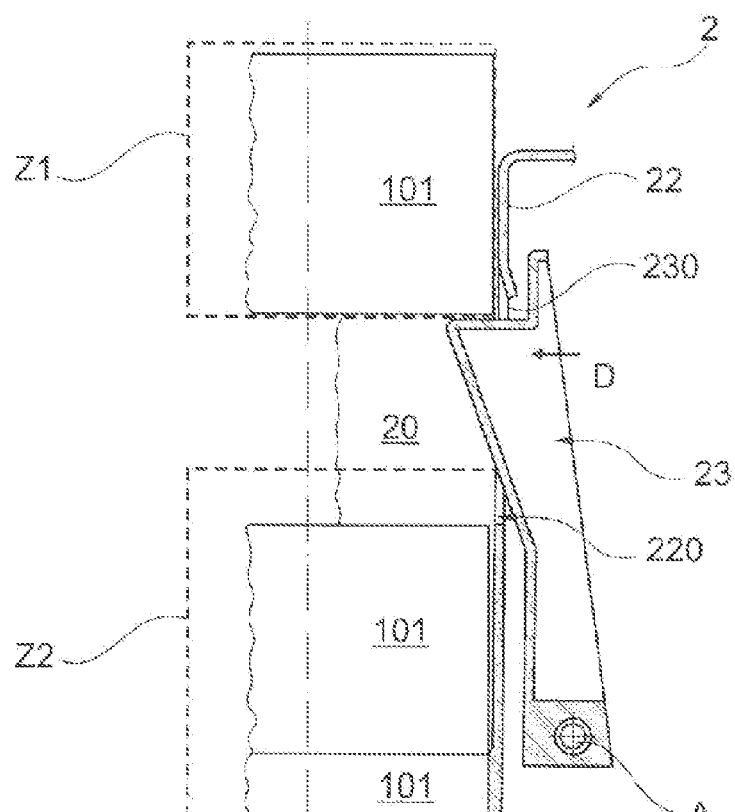
FIG. 11 is a fragmentary section view of a cart of the invention for assisting in transferring mailpieces, showing a retractable support in detail, and showing a tray placed in the storage zone and a tray placed in the stacking zone.

In the embodiment shown in FIGS. 8 to 10, the back plate 20 has an opening 200 of dimensions larger than the dimensions of the trays 101 used. This opening 200 may be provided facing the filling zone Z1 or facing the storage zone Z2, or simultaneously facing both the filling zone Z1 and the storage zone Z2. In the example shown, with reference in particular to FIG. 8, the opening 200 is provided facing the storage zone Z2. The opening 200 gives access to behind the cart 2 for assisting in transferring mailpieces, and allows a tray 101 stored in the empties zone 13 of the sorting machine 1 to pass through to the filling zone Z1 and if necessary to the storage zone Z2. In FIG. 9, the operator 3 can be seen taking hold of a tray 101 from the empties zone 13 through the opening 200, without having to bend down or to stretch out an arm to an excessive extent. The opening 200 thus makes it possible to guarantee that the workstation is ergonomic, even during the operation for retrieving empty trays 101 from the empties zone 13. With reference to FIG. 10, the tray 101 can be moved from the empties zone 13 to the filling zone Z1 merely by being moved vertically as described above.

In an embodiment that is not shown, the cart for assisting in transferring mailpieces is provided with means for lifting empty trays automatically moving at least one empty tray from the storage zone to the filling zone when the filling zone is empty of any tray to be filled. To this end, the cart for assisting in transferring mailpieces may be provided with lifting fingers on which the trays present in the storage zone rest. Such lifting fingers are provided above the bottom plate or are retracted into it through slots provided through it for this purpose. For example, said lifting fingers are guided by guide rails provided in the back plate or in one of the two side plates. The lifting fingers are also coupled to a lifting mechanism, e.g. a link connected to a counterweight suspended on the other side of the back plate or of the side plate respectively. The counterweight thus urges the empty trays to be lifted from the storage zone to the filling zone. Thus, as soon as the tray present in the filling zone has been removed, the tray(s) present in the storage zone is/are raised until a tray once again occupies the filling zone in which it is ready to be filled.

The invention makes it possible to achieve the above-mentioned objectives. The cart 2 of the invention for assisting in transferring mailpieces makes it possible in particular to procure a considerable improvement in the ergonomics of the operations necessary for placing a tray 101 facing each sorting outlet 10 to be emptied, and to make the operations for loading mailpieces 100 into the trays 101 more reliable by limiting the risks of the stacks of mailpieces 100 becoming destabilized. Finally, the invention makes it possible to optimize use of the empty trays 101. Naturally, the present invention is in no way limited to the above description of the embodiments, which can undergo modifications without going beyond the ambit of the invention.

The invention claimed is:

1. A cart for assisting in transferring mailpieces for a postal sorting machine having a row of sorting outlets at each of which the mailpieces are stacked on edge on a work surface, said cart for assisting in transferring mailpieces including a support defining the bottom of a filling zone suitable for receiving at least one tray to be filled with stacked mailpieces, said cart for assisting in transferring mailpieces being characterized in that it includes a back plate extending substantially perpendicularly to the support and carrying guide means designed to co-operate with a longitudinal runner provided on said sorting machine for the purpose of guiding said cart for assisting in transferring mailpieces along said work surface, in that an end of said back plate projecting above said support is extended by a transfer ramp inclined relative to said back plate with which it forms an acute angle and designed to bridge over the edge of the work surface to come flush with said work surface from above, regardless of the longitudinal position of said cart for assisting in transferring mailpieces.

2. The cart for assisting in transferring mailpieces according to claim 1, characterized in that it includes a storage zone for storing multiple trays, the top of which zone is defined by said support and the bottom of which zone is defined by a bottom plate secured to said back plate, said storage zone being suitable for receiving at least two trays under said filling zone.

3. The cart for assisting in transferring mailpieces according to claim 2, characterized in that said support is mounted to move between a deployed position in which it defines the bottom of said filling zone by forming a bearing plane for a tray, and a retracted position in which it is set back relative to said filling zone and allows a tray to go past from said storage zone to said filling zone without leaving said cart for assisting in transferring mailpieces.

4. The cart for assisting in transferring mailpieces according to claim 3, characterized in that said support is arranged to go from said deployed position to said retracted position by contact with a tray being moved from the storage zone to the filling zone.

5. The cart for assisting in transferring mailpieces according to claim 3, characterized in that said support is coupled to resilient return means urging it to stay in said deployed position.

6. The cart for assisting in transferring mailpieces according to claim 1, characterized in that said support includes two side rails provided on either side of said filling zone.

7. A The cart for assisting in transferring mailpieces according to claim 2, characterized in that it includes side walls defining said filling zone and said storage zone, and at least one removable receptacle provided with attaching means arranged to allow it to be attached to either of said side walls.

8. A postal sorting installation including at least one sorting machine provided with a row of sorting outlets at each of which mailpieces are stacked on edge on a work surface, and at least one cart according to claim 1 for assisting in transferring mailpieces into trays to be filled, and then in transferring the full trays (101), said postal sorting installation being characterized in that said sorting machine is provided with at least one longitudinal runner extending under said work surface and suitable for co-operating with said guide means for longitudinally guiding said cart for assisting in transferring mailpieces along said work surface, and in that the distance between said guide means and said transfer ramp, and the distance between said longitudinal runner and said work surface are arranged so that said transfer ramp bridges over the edge of said work surface to come flush with said work surface from above regardless of the longitudinal position of said cart for assisting in transferring mailpieces.

* * * * *